No. 792,944. Patented June 20, 1905.

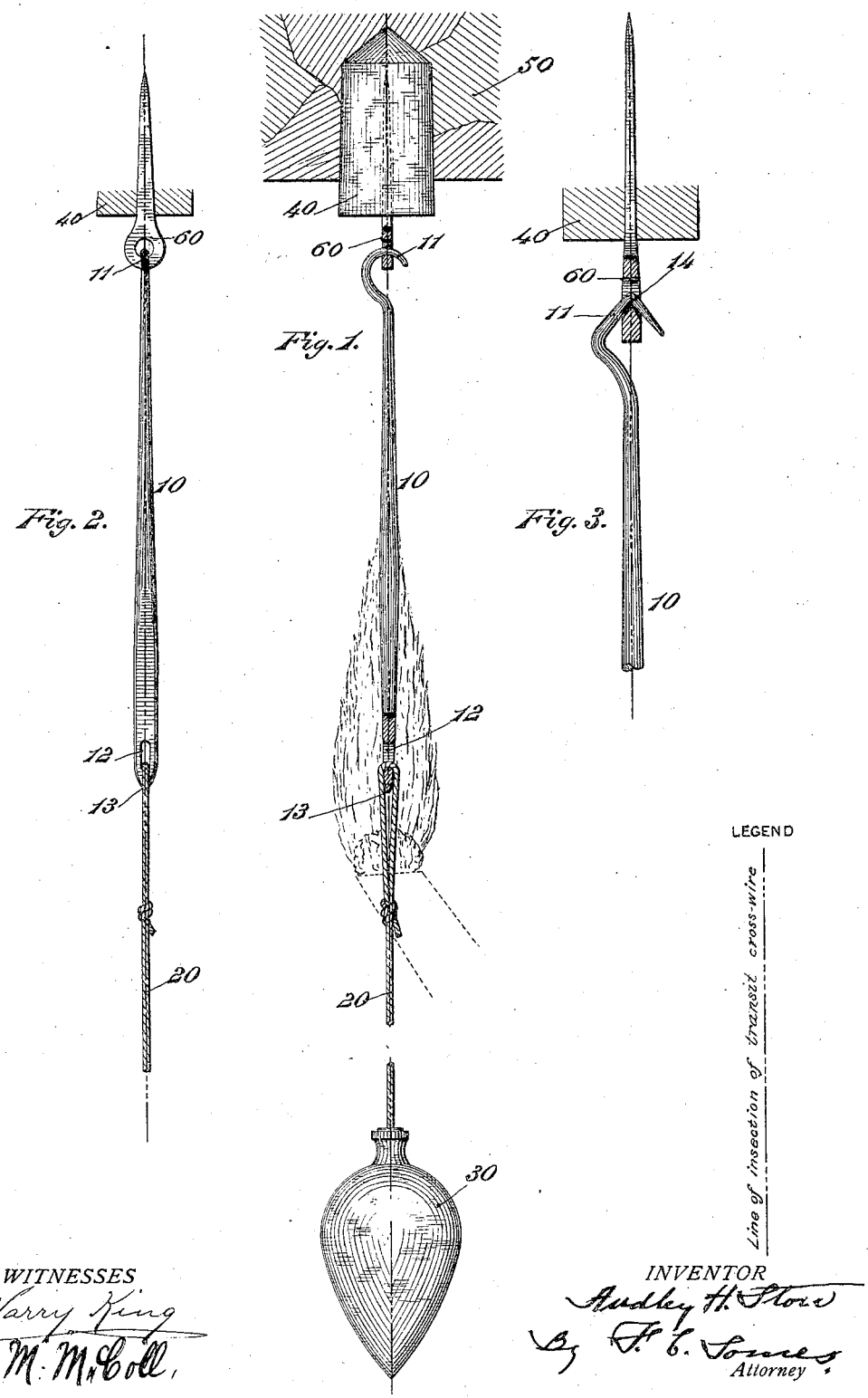

UNITED STATES PATENT OFFICE.

AUDLEY HART STOW, OF SWITCHBACK, WEST VIRGINIA.

PLUMB-BOB SUSPENSION-HOOK.

SPECIFICATION forming part of Letters Patent No. 792,944, dated June 20, 1905.

Application filed November 26, 1904. Serial No. 234,413.

*To all whom it may concern:*

Be it known that I, AUDLEY HART STOW, a citizen of the United States of America, and a resident of Switchback, in the county of McDowell, in the State of West Virginia, have invented certain new and useful Improvements in Plumb-Bob Suspension-Hooks, of which the following is a specification.

This invention relates to hooks for suspending plumb-bobs, and is especially adapted for use in coal-mines.

The objects of the invention are to provide a hook for suspending plumb-bobs which may be easily shifted from place to place in the mines and which will readily adjust itself axially to the vertical on its application to the support attached to the mine-roof, whereby it may serve some of the functions of the plumb-bob itself, being adapted to intersect the vertical cross-wire of the transit in taking observations therefrom.

Figure 1 of the accompanying drawings represents a side elevation of a plumb-bob suspended by this plumb-bob suspension-hook from a spud secured to a mine-roof, the flame of the miner's lamp being disposed behind the hook and the line of the vertical cross-wire of the transit being indicated along the axial line of the hook, a part of the plumb-bob cord being broken out. Fig. 2 represents a front elevation of the plumb-bob hook suspended from the eye secured in the mine-roof and a fragment of the plumb-bob cord attached thereto. Fig. 3 represents a side elevation of a fragment of a plumb-bob hook embodying this invention and provided with a V-shaped bearing for the spud disposed in line with the axis of the shank of the hook.

The same reference characters indicate corresponding parts in all the figures.

This plumb-bob suspension-hook comprises an elongated straight shank 10, provided at its upper end with a hook 11, near its lower end with a needle-eye 12, and preferably with a pointed lower end 13. The shank of the hook is so constructed that its axis will be plumb when the hook is suspended and is preferably made heavy at its lower end and light at its upper end. The hook is preferably provided with a V-shaped recess 14, which serves to at once throw the axis of the hook into vertical alinement with its support. The needle-eye, to which the suspension-cord of the bob is attached, serves to keep the cord in alinement with the axis of the shank, and it is preferably elongated to facilitate the insertion of the suspension-cord. This plumb-bob suspension-hook is connected up ready for use in the manner shown in Fig. 1. The suspension-cord 20 is looped through the eye 12 at the lower end of the shank of the hook 10, and the plumb-bob 30 is attached to the lower end of the said suspension-cord in the usual manner.

The coal-mines are commonly equipped with supporting devices comprising wooden plugs, as 40, inserted in the roof 50 of the mine and spuds or other eyes, as 60, driven into the wooden plugs. These spuds usually consist of horseshoe-nails provided with flattened and punched heads. In the use of a plumb-bob connected with this suspension-hook the open eye 11 at the upper end of the shank 10 is readily applied to the eye 60, and the tension of the weight tends to bring the shank of the hook, as well as the suspension-cord, in vertical alinement, and in the use of the transit the vertical cross-wire thereof may be readily brought into adjustment with the axis of the hook, which serves in many cases as a better surface for the bisection of the cross-wire than the plumb-bob itself. Owing to the forced circulation of air in mines, it is often difficult to get the plumb-bob steady enough for an exact bisection, whereas the hook, owing to its nearness to the point of support, is practically steady and there is less danger of the assistant burning the string with the flame of the lamp behind the hook than it is behind the bob. Moreover, the plumb-bob sometimes becomes dull through usage and may not, therefore, be bisected with certainty, whereas the plumb-bob hook, owing to its small diameter, may be bisected with exactness.

I claim as my invention—

1. A plumb-bob suspension-hook comprising an elongated shank provided with a hook at its upper end and a needle-eye at its lower end, the needle-eye and the bearing-point of the hook being in axial alinement with the shank.

2. A plumb-bob suspension-hook comprising a shank provided with a hook at its upper end and a needle-eye at its lower end, the eye and the bearing-point of the shank being in alinement with the axis of the shank, and the shank being weighted at its lower end.

3. A plumb-bob suspension-hook comprising an elongated shank having a needle-eye at its lower end, and a hook at its upper end having a V-shaped bearing disposed in axial alinement with said shank and eye.

4. A plumb-bob suspension-hook comprising an elongated shank provided with a pointed lower end, an eye, and a hook at its upper end, the bearing-point of the hook and the pointed lower end being in axial alinement with the shank.

AUDLEY HART STOW.

Witnesses:
REYNELL W. JAMES,
RUFUS H. BARRINGER.